Patented Jan. 16, 1945

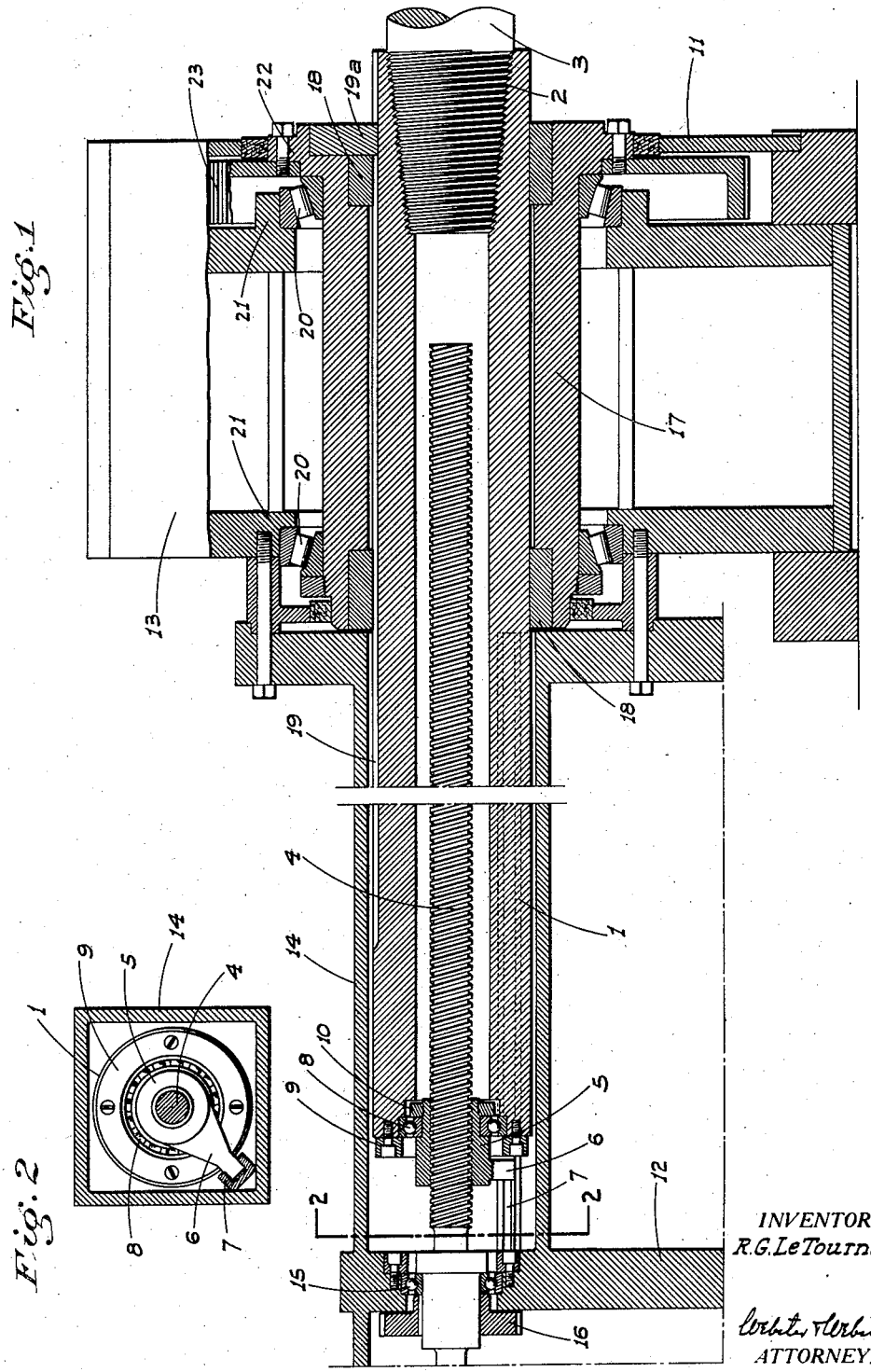

2,367,292

UNITED STATES PATENT OFFICE 2,367,292

BORING HEAD

Robert G. Le Tourneau, Peoria, Ill., assignor to R. G. Le Tourneau, Inc., Stockton, Calif., a corporation of California Application July 10, 1942, Serial No. 450,389

1 Claim. (Cl. 77—58)

This invention is directed generally to a machine tool, and particularly represents an improvement in boring heads.

The principal object of this invention is to provide a boring head which includes, in unique assembly, a tool-holding quill, a feed screw for the quill, and a driven quill rotating sleeve through which the quill extends in non-rotatable but slidable relation.

A further object of the instant invention is to provide a boring head which includes a rotary quill mounted in sliding but non-rotatable relation to its driving member, and in rotary but non-sliding relation to its feed screw.

It is also an object of this invention to provide a novel driving arrangement for the quill, such arrangement assuring positive drive of the quill without limiting axial movement thereof.

Another object is to provide a novel form of connection between the feed screw and the rotary quill, such connection being arranged to permit of rotary motion of the quill independently of the feed screw, whereby the feed screw is operative to advance or retract the quill during rotation of the latter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a sectional elevation, foreshortened, of the improved boring head.

Figure 2 is a cross section on line 2—2 of Fig. 1.

Referring now more particularly to the characters of reference on the drawing, the numeral 1 indicates an elongated tubular quill 1 formed at its forward end with a tapped socket 2 for reception in threaded relation of a boring tool 3 or the like.

An elongated, axially immovable feed screw 4 extends into the tubular quill 1 from its rear end; the feed screw being operatively connected with the rear end of the quill by the following arrangement:

A feed nut 5 is threaded on the feed screw 4 for movement therealong, such feed nut having a radially extending anti-rotation finger 6 which projects into a channel member 7 which extends lengthwise of the quill and feed screw. The channel member 7 is fixed relative to the feed screw and the finger 6 is slidable in said channel longitudinally of the latter. A ball bearing assembly 8 connects the feed nut 5 and rear end of the quill 1 for relative rotation but prevents separation of said nut and quill in an axial direction; the bearing 8 being secured in place by means of retaining rings 9 and 10 on the quill and feed nut respectively, and which engage corresponding races of the bearing.

The quill and feed screw assembly above described are mounted within a housing which includes a front wall 11 and rear wall 12; said housing being enlarged as at 13 adjacent the feed end portion of the quill, while the rear end portion 14 of the housing is of reduced diameter and relatively closely surrounds the corresponding portion of the quill.

At its rear end the feed screw 4 is journaled in a bearing 15 in back wall 12 and therebeyond is fitted with a drive gear 16; such gearing being driven from a suitable feed screw actuating gear train (not shown).

The forward end portion of the quill 1 is surrounded by a heavy duty drive sleeve 17 of substantial length, and bearing collars 18 fixed in said sleeve adjacent its ends support the quill. The quill is provided with a longitudinal groove 19 engaged by a key 19a secured in sleeve 17 at its outer end; the groove 19 being of sufficient length to permit of the desired longitudinal movement of said quill.

The sleeve 17 is supported adjacent each end by a combination annular end thrust bearing 20 which is mounted in a support 21 formed in unitary relation with the housing.

At its outer end the sleeve 17 is enlarged to form a radial flange 22 to which is secured a driving gear 23, such gear being disposed adjacent but inwardly of front wall 11 of the housing. This gear is driven by means of a suitable drive assembly (not shown) and which constitutes no part of the present invention.

Operation

In operation of the above described boring head, a suitable tool 3 is mounted in the quill 1 and the sleeve 17 is driven by gear 23. The quill 1 is then advanced to carry the tool into the work and subsequently retracted to withdraw the tool from the work, by means of the feed screw 4, which can be driven in either direction from its driving mechanism.

As feed screw 4 is rotated to advance or retract the quill, the feed nut 5 moves in a corresponding direction along the feed screw as such nut cannot rotate, due to the fact that the anti-rotation finger 6 is engaged in channel 7. Such channel, in the present embodiment, is fixed in connection with the housing portion 14. With movement of feed nut 5 along feed screw 4, a corresponding longitudinal movement is imparted to rotating quill 1, the bearing 8 permitting of rotation of said quill relative to the nonrotatable feed nut 5.

From the foregoing description it will be readily seen that I have produced such a device as sustantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a boring head which includes an axially slidable and rotatably mounted quill, said quill being circular in cross section, an axially immovably and rotatably mounted feed screw, means to rotate the quill, a feed nut on the feed screw, means independent of the quill and feed screw arranged to prevent rotation of the feed nut without limiting its movement axially, and means connecting the feed nut and quill in rotatable but non-separating relation axially; a housing closely surrounding and enclosing the quill throughout the path of movement of the feed nut, said housing being rectangular in cross section, and said rotation preventing means comprising a longitudinally extending, radially inwardly opening channel secured in the housing in one corner thereof, and a rigid finger projecting laterally from the feed nut, said finger riding in the channel.

ROBERT G. LE TOURNEAU.